US012773367B1

(12) United States Patent
Caputo et al.

(10) Patent No.: US 12,773,367 B1
(45) Date of Patent: Oct. 27, 2026

(54) PORTABLE ACTUATION AND CONTROL SYSTEM FOR WEARABLE MACHINES

(71) Applicant: Human Motion Technologies LLC, Pittsburgh, PA (US)

(72) Inventors: Joshua M. Caputo, Pittsburgh, PA (US); Tianyao Chen, Pittsburgh, PA (US)

(73) Assignee: Human Motion Technologies LLC, Pittsburgh, PA (US)

( * ) Notice: Subject to any disclaimer, the term of this patent is extended or adjusted under 35 U.S.C. 154(b) by 1141 days.

(21) Appl. No.: 17/395,815

(22) Filed: Aug. 6, 2021

Related U.S. Application Data

(60) Provisional application No. 63/062,593, filed on Aug. 7, 2020.

(51) Int. Cl.

| | |
|---|---|
| ***A61H 3/00*** | (2006.01) |
| ***A61H 1/02*** | (2006.01) |
| ***B25J 9/00*** | (2006.01) |
| ***B25J 9/10*** | (2006.01) |
| ***B25J 13/08*** | (2006.01) |
| *B25J 19/00* | (2006.01) |

(52) U.S. Cl.
CPC ............. *A61H 3/00* (2013.01); *A61H 1/0266* (2013.01); *B25J 9/0006* (2013.01); *B25J 9/104* (2013.01); *B25J 13/088* (2013.01); *A61H 2201/0107* (2013.01); *A61H 2201/0157* (2013.01); *A61H 2201/0176* (2013.01); *A61H 2201/1215* (2013.01); *A61H 2201/149* (2013.01); *A61H 2201/165* (2013.01); *A61H 2201/5097* (2013.01); *B25J 19/005* (2013.01)

(58) Field of Classification Search
CPC .................... A61H 3/00; A61H 1/0266; A61H 2201/0107; A61H 2201/0157; A61H 2201/0176; A61H 2201/1215; A61H 2201/149; A61H 2201/165; A61H 2201/5097; B25J 9/0006; B25J 9/005; B25J 9/104; B25J 13/088
See application file for complete search history.

(56) References Cited

U.S. PATENT DOCUMENTS 11,191,653 B2 * 12/2021 Grandmaison .......... A61H 3/00
2004/0249316 A1 * 12/2004 Ashihara ................ A61B 5/112 600/595
2015/0164660 A1 * 6/2015 Will ...................... A61F 5/0123 602/26
(Continued)

*Primary Examiner* — Timothy A Stanis
*Assistant Examiner* — Matthew R Moon
(74) *Attorney, Agent, or Firm* — K&L Gates LLP

(57) ABSTRACT

A portable control assembly for a user-wearable machine is disclosed. The portable control assembly comprises a user-wearable machine worn by the user and a portable control system. The portable control system is configured to control the user-wearable machine. The portable control system comprises a housing, a motor, a motor controller configured to control the motor, a power source configured to power the motor, and a gearbox-less power train coupled between the motor and the user-wearable machine to drive the user-wearable machine with the motor. The gearbox-less power train comprises a pulley that is driven by the motor and a flexible transmission cable connected between the pulley and the user-wearable machine to transfer force from the motor to the user-wearable machine.

19 Claims, 4 Drawing Sheets

(56) References Cited

U.S. PATENT DOCUMENTS

| | | | | |
|---|---|---|---|---|
| 2016/0107309 | A1* | 4/2016 | Walsh | A63B 21/0054<br>248/550 |
| 2017/0119613 | A1* | 5/2017 | Roh | A61H 1/0237 |
| 2017/0202724 | A1* | 7/2017 | De Rossi | A61H 3/00 |
| 2018/0177668 | A1* | 6/2018 | Park | A61H 1/0255 |
| 2019/0201275 | A1* | 7/2019 | Chamberlain | G08B 25/001 |
| 2019/0343710 | A1* | 11/2019 | Lerner | A61H 3/00 |
| 2020/0121478 | A1* | 4/2020 | Woge | B25J 9/1633 |
| 2022/0016759 | A1* | 1/2022 | Sauerwald | B25J 19/068 |
| 2022/0023131 | A1* | 1/2022 | Baldoni | A61H 1/0237 |

* cited by examiner

PORTABLE ACTUATION AND CONTROL SYSTEM FOR WEARABLE MACHINES

CROSS-REFERENCE TO RELATED APPLICATIONS

The present application claims priority under 35 U.S.C. § 119(e) to U.S. Provisional Patent Application Ser. No. 63/062,593, titled PORTABLE ACTUATION AND CONTROL SYSTEM FOR WEARABLE MACHINES, filed Aug. 7, 2020, the disclosure of which is herein incorporated by reference in its entirety.

BACKGROUND

Wearable machines such as exoskeleton devices, for example, are used to provide force to one or more body parts of a human for locomotion. Conventional exoskeleton devices and prosthetics are supported by large control units. These control units are heavy and burdensome for a user to carry, and thus, the control units are housed in remote consoles.

Various existing actuation and/or control systems have size and/or electrical requirements that hinder portability of the systems. In order to generate the kinds of forces necessary to assist a human joint in any meaningful way, such existing systems utilize an electric motor with a gearbox. However, gearboxes add inherent inertia to the system, slow the system down, and/or deplete overall performance of the exoskeleton system. Additionally, the use of gearboxes increases the overall size and/or weight of the system. The dimensions and/or specifications of existing exoskeleton systems limit their use outside of the clinical setting and/or their use for various functionalities and/or activities. While self-contained portable, powered exoskeletons exist, their performance is limited as actuation and/or control is at the joint. Such a location requires the components of the portable system to be small in size and/or lightweight thereby significantly limiting the performance of the exoskeleton.

SUMMARY

In one general aspect, the present invention is directed to an exoskeleton assembly for a user that comprises an exoskeleton device and a portable control system, that can be wearable as a backpack by the user wearing the exoskeleton device, where the portable control system controls and powers the exoskeleton device. The portable control system comprises a housing (e.g. a backpack), a motor positioned in the housing, a motor controller configured to control the motor, a power source configured to power the motor, and a gearbox-less power train coupled between the motor and the exoskeleton device. The gearbox-less power train comprises a pulley that is driven by the motor and a flexible transmission cable connected between the pulley and the exoskeleton device to transfer force from the motor to the exoskeleton device.

In another general aspect, the present invention is directed to a portable control system configured to control a user-wearable machine. The portable control system comprises a housing (e.g. a backpack), a motor positioned in the housing, a motor controller configured to control the motor, a power source configured to power the motor, and a gearbox-less power train coupled between the motor and the user-wearable machine to drive the user-wearable machine with the motor. The gearbox-less power train comprises a pulley that is driven by the motor and a flexible transmission cable connected between the pulley and the user-wearable machine to transfer force from the motor to the user-wearable machine.

BRIEF DESCRIPTION OF THE DRAWINGS

Various features of the exemplary embodiments described herein, together with advantages thereof, may be understood in accordance with the following description taken in conjunction with the accompanying drawings as follows.

Corresponding reference characters indicate corresponding parts throughout the several views. The exemplifications set out herein illustrate various embodiments of the invention, in one form, and such exemplifications are not to be construed as limiting the scope of the invention in any manner.

DESCRIPTION

Existing control systems for user-wearable devices are oftentimes confined to use in a clinical setting due, at least in part, to the bulkiness and/or weight of motor systems. With a goal of providing a portable system that can assist joint motion and/or monitor joint movement, the control systems disclosed herein are designed to produce sufficient force to operate exoskeletons and/or prosthetic joints through a cable system that is powered and driven from a portable and/or wearable housing. In various instances, the control system can be worn, ideally, by the person wearing the exoskeleton and/or prosthetic device. In various instances, the control system can be worn and/or carried by someone other than the user. In various instances, the control system can rest nearby the user-wearable machine such as on a workbench or in a cart, for example. In any event, suitable housing includes, for example, a backpack, a duffel bag, a suitcase, a purse, a fanny pack, and/or any other portable storage medium. The portable functionality of the control systems disclosed herein is achieved by removing the gearbox and placing a motor controller, power source, and motor in a wearable and/or easily transportable housing.

Figure 1:
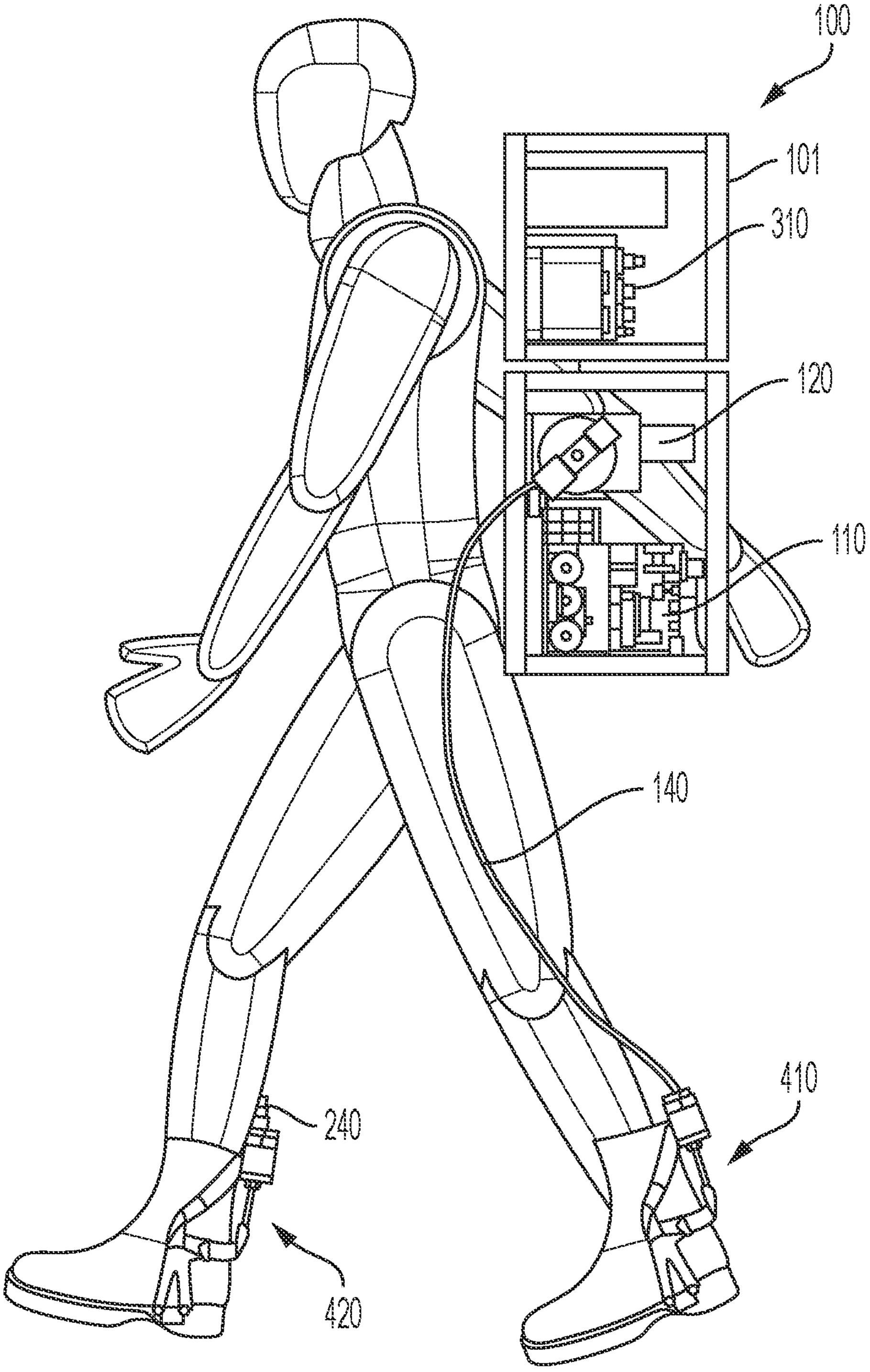
FIG. 1 is a perspective view of a user wearing a portable control system connected to a right ankle exoskeleton and a left ankle exoskeleton in accordance with at least one aspect of the disclosure.
Figure 2:
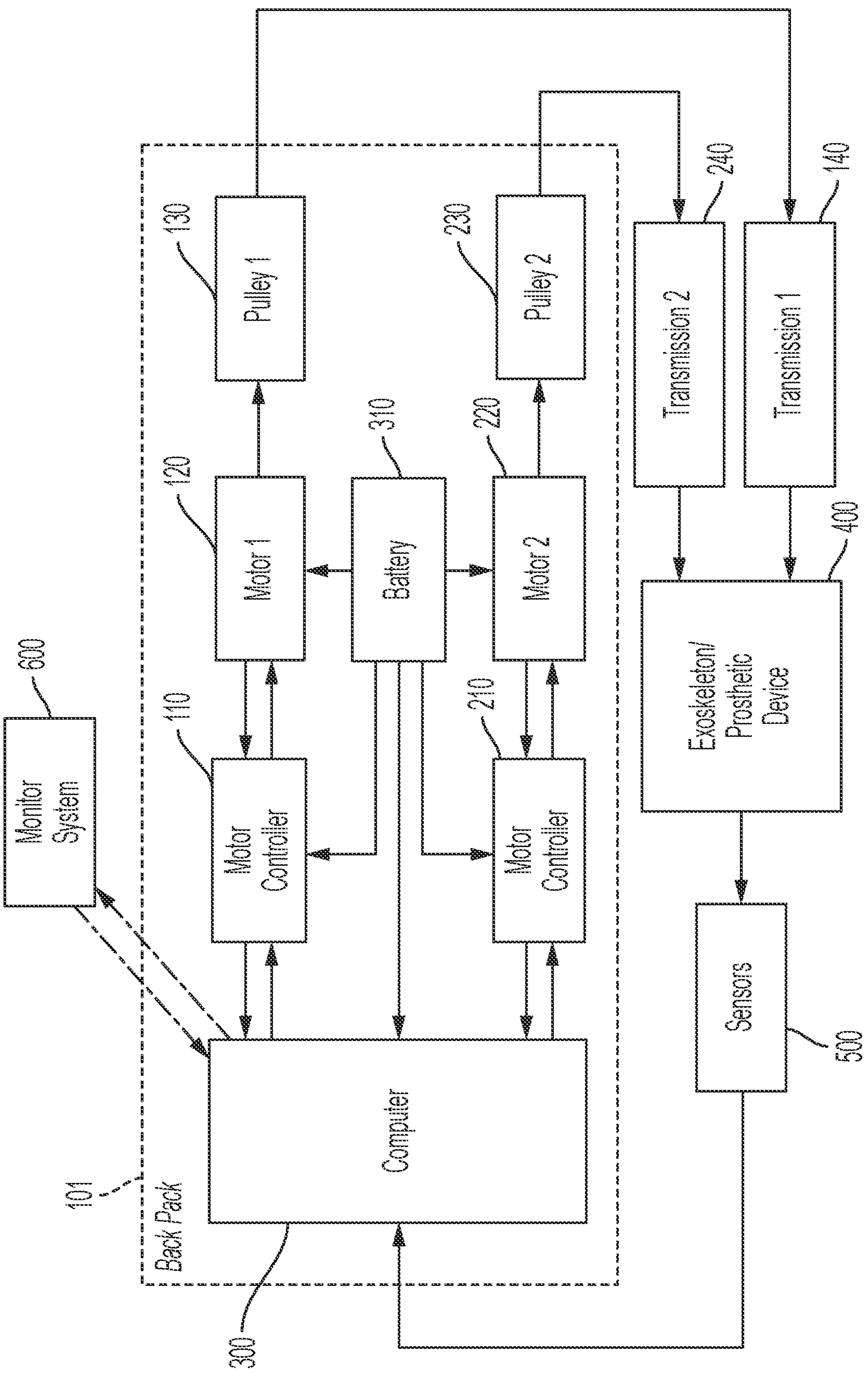
FIG. 2 is a schematic representation of the portable control system of FIG. 1.
Figure 3:
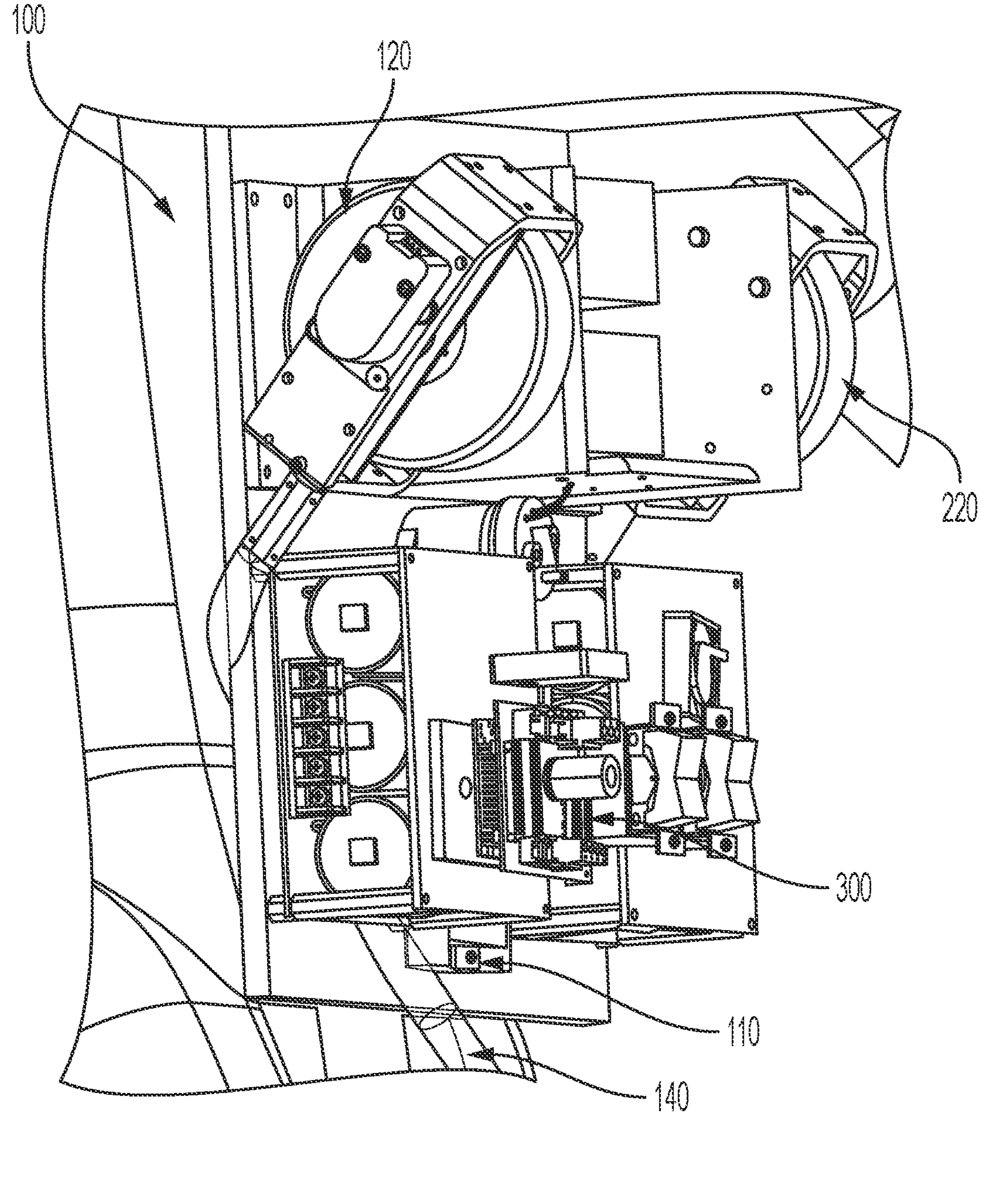
FIG. 3 is a partial perspective view of the portable control system of FIG. 1.
Figure 4:
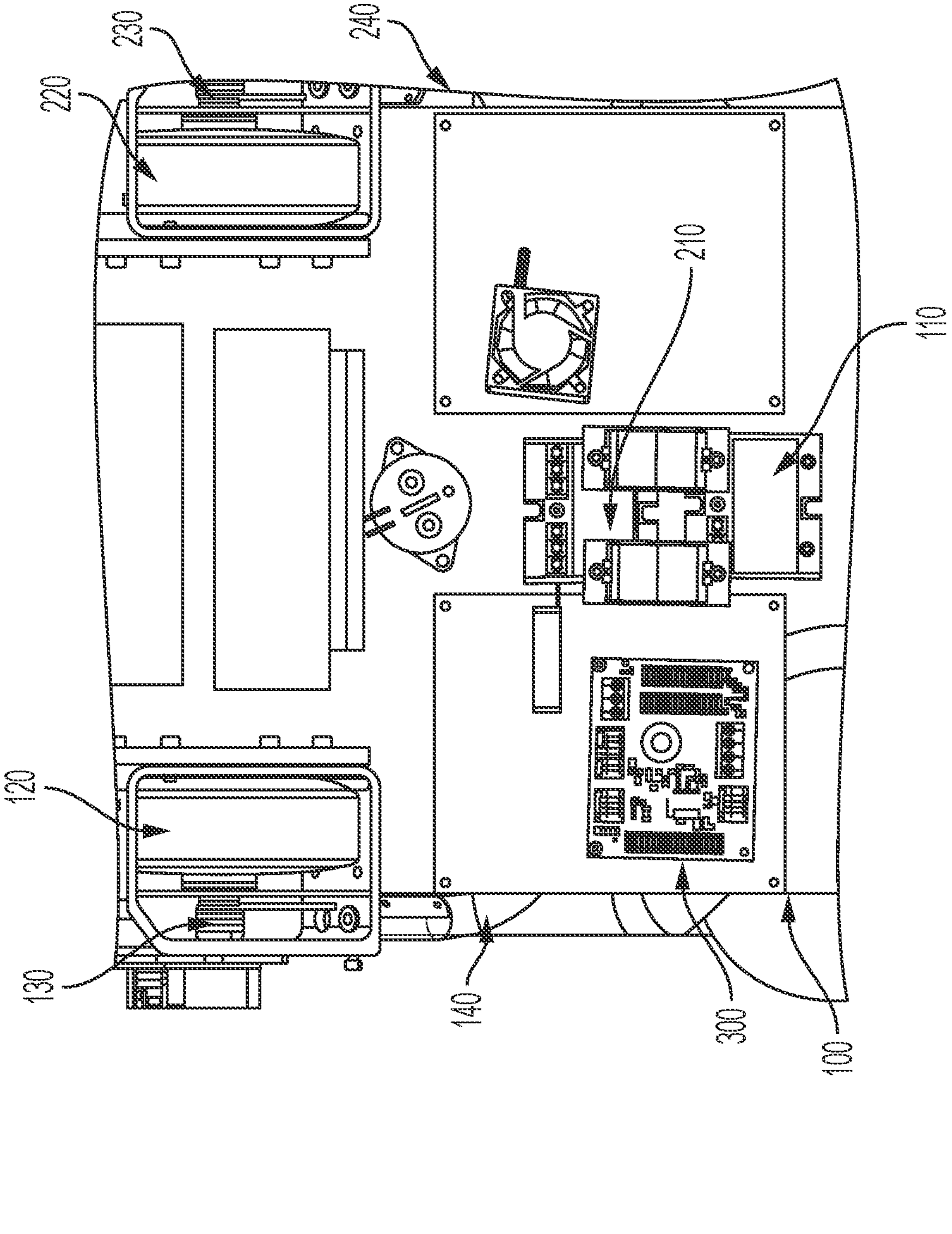
FIG. 4 shows a partial plan view of the portable control system of FIG. 1.

FIGS. 1 and 2 depict a portable control system 100. The portable control system 100 comprises one or more motors 120, 220 and a power source 310 stored in a housing 101. The housing 101 is depicted as a backpack; however, as described in greater detail herein, the housing 101 can be of any wearable and/or easily transportable form. The power source 310 is configured to power the portable control system 100. In the illustrated example, a left ankle exoskeleton 410 is positioned around a user's left ankle and a right ankle exoskeleton 420 is positioned around a user's right ankle. Thus, the user wears both the exoskeleton (two exoskeletons in this example) as well as the portable control system 100. While FIG. 1 depicts the portable control system 100 connected to ankle exoskeletons 410, 420, the portable control system 100 can be used with other types of motor-driven exoskeletons and/or prosthetic devices. For example, the portable control system can be used to operate one or more motor-driven exoskeletons and/or prosthetics for specific joints such as the ankle, knee, hip, elbow, wrist, shoulder, and/or finger. Exoskeletons, and the operation thereof, are described in greater detail in U.S. patent application Ser. No. 15/605,313, filed on May 25, 2017, entitled EXOSKELETON DEVICE AND CONTROL SYSTEM, published as U.S. Publication No. 2018/0125738, which is hereby incorporated by reference in its entirety. The portable control system 100 may include straps or a harness, etc., to attach the portable control system 100 to the user (wearer) of the portable control system. As shown in FIG. 1, for example, the portable control system 100 may include shoulder straps and/or a waist strap to strap the portable control system 100 to the user/wearer.

In various instances, the portable control system 100 comprises one motor to control all exoskeletons and/or prosthetic devices connected thereto. In other instances, the portable control system 100 comprises one or more motors to control each exoskeleton and/or prosthetic device connected thereto. In any event, the one or more motors comprise a brushless DC motor with a high power rating configured to provide an optimal speed and/or power density.

The portable control system 100 further comprises a motor controller 110 positioned in the housing 101 to control and/or operate the first motor 120. The motor controller 110 comprises a microprocessor and/or computer 300 operably coupled to the one or more motors 120, 220 to control the operation of the one or more motors 120, 220. The processor 300 is configured to perform onboard calculations, monitor motor positions, and/or receive feedback from the controlled exoskeletons 410, 420. The processor 300 is also configured to transmit communications to and/or receive communications from a monitoring system 600 located outside of the backpack 101, such as a remote computer device, for example.

The power source 310 comprises a battery that supplies power to the one or more motors 120, 220, the motor controllers 110, 210, and/or the processor 300. In various instances, the power source 310 comprises a rechargeable battery pack.

The portable control system 100 comprises one or more sensors configured to provide various information to the first motor controller 110 related to a current operating status and/or position of the first motor 120. In instances where a user is wearing a second exoskeleton and/or prosthetic device, the portable control system 100 may comprise a second motor controller 210 as shown in FIG. 2. In other instances, one motor controller may control and/or operate multiple motors. As shown in FIG. 2, the second motor controller 210 controls and/or operates a second motor 220. The portable control system 100 comprises one or more sensors configured to provide information to the second motor controller 210 related to a current operating status and/or position of the second motor 220.

The portable control system 100 further comprises a gearbox-less power train coupled between the one or more motors 120, 220 and the exoskeleton device(s) 410, 420 to drive the exoskeleton device(s) with the motor(s). The gearbox-less power train comprises a first pulley 130 is connected to the first motor 120. The dimensions of the first pulley 130 are determined, at least in part, by force and/or speed requirements related to a particular exoskeleton/prosthetic device 410. The depicted gearbox-less power train further comprises a second pulley 230 is connected to the second motor 220. The dimensions of the second pulley 230 are determined, at least in part, by force and/or speed requirements related to the second exoskeleton/prosthetic device. The battery 310 is further configured to power the second motor 220. The first pulley 130 is connected to the first exoskeleton 410 through a first flexible transmission 140, and the second pulley 230 is connected to the second exoskeleton 420 through a second flexible transmission 240. The flexible transmission cables 140, 240 are configured to transfer force from the motor 120, 220 to the respective exoskeleton 410, 420.

Each exoskeleton and/or prosthetic device 410, 420 comprises one or more sensors 500 that are configured to provide information about a current operating status, position, and/or orientation of the exoskeleton/prosthetic device 410, 420 to the respective motor controller 210, 220, the processor 300 and/or the remote monitoring system 600. In various instances, the sensors 500 are configured to communicate with the motor controller 110, 210 wirelessly (e.g., such as via Bluetooth, BLE, or any other suitable wireless communication protocol). In other embodiments, there could be a wired data communication link or cable (e.g., Ethernet) between the sensors 500 and the portable control system 100. In a clinical setting, for example, the monitoring system 600 can be used by a clinician to control the one or more exoskeletons/prosthetic devices 410, 420 for patient rehabilitation. The processor 300 of the portable control system 100 is configured to transmit and/or receive information from the remote monitoring system 600. In various instances, the processor 300 of the portable control system 100 is configured to communicate with the monitoring system 600 wirelessly (e.g., via Bluetooth, WiFi, or any other suitable wireless communication protocol).

In various instances, the user might only be wearing one exoskeleton at a particular time, such that the portable control system 100 is connected to the sole exoskeleton device worn by the user. The backpack control system 100 is configured to be connected to a variety of different types of exoskeleton devices, such as ankle, knee, hip, etc. exoskeleton devices. As shown in FIG. 1, for example, the user could wear multiple exoskeleton devices simultaneously, in which case the power control system can be connected to, power and control each of the exoskeleton devices worn by the user (which could be of different types too).

As depicted in the example of FIG. 1, the portable control system 100 is connected to the left ankle exoskeleton 410 and the right ankle exoskeleton 420 by a first flexible transmission 140 and a second flexible transmission 240, respectively. A first cable extends from the backpack 101 to the left ankle exoskeleton 410 through the first flexible transmission 140. A second cable extends from the backpack 101 to the right exoskeleton 420 through the second flexible transmission 240. The first and second cables are configured to transfer the force from the one or more motors 120, 220 stored in the backpack 101 to the ankle exoskeletons 410, 420, respectively. The first and/or second flexible transmissions 140, 240 may be Bowden cables, for example.

As the portable control system 100 is configured for use with various types of exoskeleton devices, customization of the components and/or operational parameters of the portable control system 100 is necessary to achieve optimal results for each unique exoskeleton and/or user. Such optimization can be obtained by selecting the smallest radius of the pulley that also provides a sufficient torque to speed relationship for a specific user and/or joint being assisted. Optimal dimensions of the pulley change based on the type of exoskeleton attached thereto.

The portable control systems disclosed herein preferably comprise a modular pulley system with modular/interchangeable pulleys of different size (e.g., radius) to effect different drive forces on the exoskeleton. Stated another way, a user and/or clinician can remove a first pulley comprising a first radius from the portable control system and replace it with an interchangeable, second pulley having a different radius than the removed pulley in order to achieve a different speed and/or torque combination with the second pulley in comparison to the first (removed pulley), without changing any other parts or components of the portable control system 100. For example, the first radius of the first pulley is smaller than the second radius of the second pulley. A portable control system comprising the first pulley may obtain optimal results when used to control a wrist exoskeleton. However, use of the first pulley may obtain less than optimal results when used to control an ankle exoskeleton. In such circumstances, the user can remove the first pulley and replace it with the second pulley. Using a pulley with a different radius allows the control system to effectively and/or efficiently assist different users and/or joints. Also, as explained above, the portable control system 100 preferably does not include a gear box connected between the motor and the exoskeleton device. Removal of the gear box reduces the weight of the portable control system (in comparison to a comparable portable control system with a gear box), thereby making the portable control system easier to carry for the user.

The portable control systems disclosed herein have the ability to be fully controlled by the user and/or a clinician. In various instances, a user wears the exoskeleton and a clinician operates the exoskeleton. While the user derives the benefit from wearing the exoskeleton and portable control system, the clinician and/or operator interacts with a remote user interface to operate and/or monitor the functionality of the portable control system. The remote user interface can be on the remote computer device, on a handheld device, and/or on any other suitable device. In other instances, a user both wears and operates the exoskeleton. In such instances, the user is able to interact with the user interface to operate and/or monitor the functionality of the portable control system.

The portable control systems disclosed herein can further comprise one or more safety features. A first safety feature comprises a manual emergency stop on the portable control system, or connected thereto, that permits the user and/or operator to disable power to the system in the case of an emergency. In various instances, the manual emergency stop is implemented with a strap and/or a button on the housing that can be activated easily by the user to disable power to the motor. In various instances, a clinician could also activate the emergency stop by a toggle and/or button on the user interface and/or the remote computer device to disable power to the motor. In various instances, the portable control system may also comprise an override switch to disable the manual safety feature and permit use of the portable control system. The override switch can be activated by the user and/or the clinician.

A second safety feature comprises an automatic emergency stop that disables power to the motor of the portable control system for safety when the system is not responding appropriately and/or is operating unexpectedly. In various instances, the portable control system comprises a mechanical fuse and/or a breakaway that mechanically decouples the user-wearable machine from the motor in the event of an excessive force application by the actuator, for example. Such a safety feature can be achieved through selection of cable strength. Stated another way, either the entire length of the cable or a section of the cable can be made weaker than the rest to ensure a controlled failure point. In other instances, the safety feature is achieved by a coupler comprising a shear pin positioned therein between the motor shaft and the pulley. In various instances, the portable control system comprises an override switch to disable the automatic safety feature and permit use of the portable control system. The override switch can be activated by the user and/or the clinician.

A third safety feature comprises an electric relay switch that prevents a user from hyperextending a joint and/or experiencing an injury by disabling power to the motor as a threshold position and/or orientation of the exoskeleton is approached, for example. The exoskeleton or other wearable device contains one or more sensors that monitor a current joint position and/or orientation for the joint for which an exoskeleton replaces. The one or more sensors are configured to communicate the detected information to the processor in the portable housing and/or the remote desktop computer. The information can be transmitted through wireless and/or wired communication. The processor within the portable control system is configured to monitor joint position during use of the exoskeleton and/or ensure that the joint stays within a desired range of motion. In various instances, the desired range of motion is specific to the user and/or the particular joint. For example, in an effort to keep the system from injuring the subject due to overextending a joint, joint position thresholds can be customized for each person and/or joint. When the joint position threshold is approached, the one or more sensors are configured to communicate with the processor and/or motor controller to shut off and/or slow down the motor system. If the joint position threshold is exceeded the controller is configured to disable power to the system entirely. In any event, the processor is configured to send an alert to the user and/or clinician through the user interface to notify the user and/or clinician of the detected position and/or error.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. An exoskeleton assembly for a user, comprising:

an exoskeleton device configured to be worn by the user, the exoskeleton device comprises one or more sensors to detect a real-time orientation of the exoskeleton device, the real-time orientation is indicative of a current joint position of the user wearing the exoskeleton device;

a portable control system worn by the user, wherein the portable control system is configured to control the exoskeleton device, wherein the portable control system comprises:

a housing;

a motor;

a motor controller configured to control the motor;

a power source configured to power the motor;

a gearbox-less power train coupled between the motor and the exoskeleton device to drive the exoskeleton device with the motor, wherein the gearbox-less power train comprises:

a first pulley replaceably attachable to the motor that is driven by the motor when the first pulley is attached to the motor, the first pulley comprising a first radius;

a second pulley replaceably attachable to the motor in lieu of the first pulley, the motor to drive rotation of the second pulley when the second pulley is attached to the motor in lieu of the first pulley, the second pulley comprises a second radius that is different than the first radius; and a flexible transmission cable connected between the first pulley and the exoskeleton device to transfer force from the motor to the exoskeleton device when the first pulley is attached to the motor, wherein the flexible transmission cable is connected between the second pulley and the exoskeleton device to transfer force from the motor to the exoskeleton device when the second pulley is attached to the motor; and a processor, wherein the one or more sensors are configured to communicate the detected real-time orientation to the motor controller, wherein the processor is configured to compare the detected real-time orientation to a threshold orientation, wherein the processor is configured to shut off the motor when the detected real-time orientation reaches or exceeds the threshold orientation.

2. The exoskeleton assembly of claim 1, wherein an optimal diameter of the first pulley is determined based on at least one of a type of the exoskeleton device and a characteristic of the user.

3. The exoskeleton assembly of claim 1, wherein the motor comprises a direct drive, brushless DC motor.

4. The exoskeleton assembly of claim 1, wherein the housing comprises a backpack.

5. The exoskeleton assembly of claim 1, wherein the exoskeleton device comprises an ankle exoskeleton.

6. The exoskeleton assembly of claim 1, wherein the power source is a rechargeable battery pack.

7. The exoskeleton assembly of claim 1, wherein the motor controller is configured to communicate wirelessly with an external monitoring device.

8. The exoskeleton assembly of claim 1, wherein the processor is configured to alert a user as the detected real-time orientation approaches the threshold orientation.

9. The exoskeleton assembly of claim 1, wherein the portable control system comprises an emergency shut off to shut off the motor when the emergency shut off is activated by a user.

10. The exoskeleton assembly of claim 1, wherein the exoskeleton device is a lower extremity exoskeleton device and the motor is a first motor, and wherein the exoskeleton assembly further comprises:

a second motor a third pulley that is driven by the second motor;

an upper extremity exoskeleton device configured to be worn by the user; and a second flexible transmission cable connected between the third pulley and the upper extremity exoskeleton device to transfer force from the second motor to the upper extremity exoskeleton device.

11. The exoskeleton assembly of claim 10, wherein the lower extremity exoskeleton device is an ankle exoskeleton and the upper extremity exoskeleton device is a wrist exoskeleton.

12. A portable control system configured to control a user-wearable machine, the portable control system for use by a user, wherein the portable control system comprises:

a housing;

a motor;

a motor controller configured to control the motor;

a power source configured to power the motor;

a first pulley replaceably attachable directly to the motor, the motor to drive rotation of the first pulley when the first pulley is attached directly to the motor, the first pulley comprises a first radius;

a second pulley replaceably attachable directly to the motor in lieu of the first pulley, the motor to drive rotation of the second pulley when the second pulley is attached directly to the motor in lieu of the first pulley, the second pulley comprises a second radius that is different than the first radius; and a flexible transmission cable connected between the first pulley and the user-wearable machine to transfer force from the motor to the user-wearable machine when the first pulley is directly attached to the motor, wherein the flexible transmission cable is connected between the second pulley and the user-wearable machine to transfer force from the motor to the user-wearable machine when the second pulley is directly attached to the motor.

13. The portable control system of claim 12, wherein the portable control system is configured to be worn by the user.

14. The portable control system of claim 12, wherein the user-wearable machine comprises an exoskeleton device.

15. The portable control system of claim 12, wherein the user-wearable machine comprises a prosthetic device.

16. The portable control system of claim 12, wherein the first pulley applies a first amount of torque to the flexible transmission cable when the first pulley is attached to the motor and the motor is actuated, wherein the second pulley applies a second amount of torque to the flexible transmission cable when the second pulley is attached to the motor and the motor is actuated, and wherein the first amount of torque and the second amount of torque are different.

17. The portable control system of claim 16, wherein the flexible transmission cable transfers the first amount of torque to the user-wearable machine when the first pulley is attached to the motor, and wherein the flexible transmission cable transfers the second amount of torque to the user-wearable machine when the second pulley is attached to the motor.

18. The portable control system of claim 12, wherein the user-wearable machine is a lower extremity user-wearable machine and the motor is a first motor, wherein the control system is further configured to control an upper extremity user-wearable machine, and wherein the portable control system further comprises:

a second motor;

a third pulley replaceably attachable to the second motor, the second motor to drive rotation of the third pulley; and a second flexible transmission cable connected between the third pulley and the upper extremity user-wearable machine to transfer force from the second motor to the upper extremity user-wearable machine.

19. The portable control system of claim 18, wherein the lower extremity user-wearable machine is an ankle exoskeleton and the upper extremity user-wearable machine is a wrist exoskeleton.

* * * * *